(12) United States Patent
Gebbink et al.

(10) Patent No.: US 10,994,471 B2
(45) Date of Patent: May 4, 2021

(54) SLEEVE APPLICATOR SYSTEM AND METHOD

(71) Applicant: Fuji Seal International, Inc., Osaka (JP)

(72) Inventors: Jeroen Gerrit Anton Gebbink, Helmond (NL); Lucas Van Rijsewijk, Boxtel (NL)

(73) Assignee: Fuji Seal International, Inc., Osaka (JP)

( * ) Notice: Subject to any disclaimer, the term of this patent is extended or adjusted under 35 U.S.C. 154(b) by 61 days.

(21) Appl. No.: 16/342,747

(22) PCT Filed: Oct. 19, 2017

(86) PCT No.: PCT/NL2017/050686
§ 371 (c)(1),
(2) Date: Apr. 17, 2019

(87) PCT Pub. No.: WO2018/074927
PCT Pub. Date: Apr. 26, 2018

(65) Prior Publication Data
US 2019/0283310 A1  Sep. 19, 2019

(30) Foreign Application Priority Data
Oct. 19, 2016  (NL) .................................... 2017641

(51) Int. Cl.
*B29C 63/42* (2006.01)
*B29C 63/00* (2006.01)
*B65C 3/06* (2006.01)

(52) U.S. Cl.
CPC ........ *B29C 63/426* (2013.01); *B29C 63/0004* (2013.01); *B65C 3/065* (2013.01);
(Continued)

(58) Field of Classification Search
CPC ..... B29C 63/0004; B29C 63/18; B29C 63/42; B29C 63/423; B29C 63/426;
(Continued)

(56) References Cited

U.S. PATENT DOCUMENTS 4,545,181 A  10/1985 Frankfort
6,070,399 A  6/2000 Huang et al.
(Continued)

OTHER PUBLICATIONS

International Search Report and Written Opinion dated Jan. 8, 2018 for Application No. PCT/NL2017/050686, 10 pgs.

*Primary Examiner* — George R Koch
(74) *Attorney, Agent, or Firm* — Frost Brown Todd LLC (57) ABSTRACT

The present invention is related to a sleeve applicator system for applying a heat-shrinkable sleeve to an object that moves in a first direction. The present invention further relates to a corresponding method.
According to the invention, a second mandrel is mounted in a flexible manner to a first mandrel. A second drive system is used for moving the heat-shrinkable sleeve from the first mandrel over the second mandrel towards the object.
The second drive system is further configured to push the second mandrel such that the second mandrel moves along with the moving object during the application of the sleeve.

20 Claims, 8 Drawing Sheets

(52) U.S. Cl.
CPC ............... *B29C 2793/0027* (2013.01); *B29C 2793/0081* (2013.01)

(58) Field of Classification Search
CPC .... B29C 2793/0027; B29C 2793/0081; B65C 3/065; B65B 9/14; B65B 57/04; B65B 57/06; B65L 2031/7158
See application file for complete search history.

(56) References Cited

U.S. PATENT DOCUMENTS

| | | |
|---|---|---|
| 7,398,811 B1 | 7/2008 | Duncan et al. |
| 2015/0096675 A1* | 4/2015 | Duncan ................ B65C 9/02 156/256 |
| 2017/0233128 A1* | 8/2017 | Lang .................... B29C 65/66 156/86 |

\* cited by examiner

SLEEVE APPLICATOR SYSTEM AND METHOD

This application is a National Stage Entry of PCT Application No. PCT/NL2017/050686, entitled "Sleeve Applicator System and Method," filed Oct. 19, 2017, which claims priority to and benefit of NL Application 2017641, entitled "Sleeve Applicator System and Method," filed Oct. 19, 2016, the disclosures of which are incorporated by reference herein.

The present invention is related to a sleeve applicator system for applying a heat-shrinkable sleeve to an object that moves in a first direction. The present invention further relates to a corresponding method.

Heat-shrinkable sleeves are often used to provide information or decoration to products. Well known examples include the brand marking on containers for beverages or the product and brand information on containers holding cosmetics, laundry detergents etc.

A heat-shrinkable sleeve is made from material that shrinks when sufficient heat is applied. Normally, the heat-shrinkable sleeves are applied to the product from a top side after which the products and sleeves are conveyed through a heat tunnel to allow the sleeve to shrink onto the product.

The application of the sleeve onto the product is a critical step. Current sleeves are made from relatively thin foil, making the sleeve more susceptible to damage when applying the sleeve onto the product. Moreover, such sleeves are more susceptible of getting jammed, resulting in a misapplication of the sleeve. Consequently, one has to ensure the proper positioning of the products relative to the sleeves before applying them. The step of proper positioning is complicated further due to the fact that in most production lines, the products are continuously moving, even during the application of the sleeves. On the other hand, a demand exists for higher throughputs, expressed in the amount of products provided with a sleeve per unit time. Reaching high throughputs while at the same time ensuring a reliable sleeve application, is a challenging problem.

U.S. Pat. No. 4,545,181 addresses the abovementioned problem. This known system comprises a first mandrel system that includes a first mandrel for receiving a heat-shrinkable sleeve, and a first drive system for moving the heat-shrinkable sleeve over the first mandrel to a downstream end of the first mandrel. This known system further comprises a second mandrel system that comprises a second mandrel that is moveably connected to the first mandrel at the downstream end thereof, wherein the second mandrel is able to move back and forth relative to the first mandrel in at least the first direction. The second mandrel system further includes a second drive system for receiving the heat-shrinkable sleeve from the first mandrel and for moving the heat-shrinkable sleeve over the second mandrel towards the object.

In the known system, the second mandrel is mounted such that it is free to oscillate relative to the first mandrel. Consequently, when a sleeve has been partially applied to a product, meaning that the sleeve is partially located on the second mandrel and partially on the product, the second mandrel is able to move along with the product as the latter drags the second mandrel via the partially applied sleeve. This motion reduces the chance of the sleeve bending, which would cause an undesirable result after shrinking, and/or reduces the change of the sleeve being misapplied.

The applicant has found that it is difficult to achieve satisfying results using the known system, especially with contemporary thin sleeves and/or in case of increased production speeds.

It is therefore an object of the present invention to provide a solution to the abovementioned problem.

According to a first aspect of the present invention, this object is achieved by a sleeve applicator system that is characterized in that the second drive system is further configured to push the second mandrel such that the second mandrel moves along with the moving object during the application of the sleeve.

Compared to the known system, the present invention proposes to actively move the second mandrel relative to the first mandrel during the application of the sleeve. This reduces the forces exerted on the sleeve when it is partially located on the product. When less forces act on the sleeve, a higher application reliability and/or increased production speed can be obtained allowing the use of thinner films.

Furthermore, in the known system, the movement of the second mandrel along with the product depends on how much of the sleeve is still arranged on the second mandrel. In the present invention, this movement can be controlled independently allowing the second mandrel to keep moving along with the product with a relatively large and controllable offset in the first direction.

The second drive system may comprise a first application drive unit for said moving the heat-shrinkable sleeve over the second mandrel towards the object, and a first engagement drive unit for pushing the first application drive unit into engagement with the heat-shrinkable sleeve thereby simultaneously pushing the second mandrel such that the second mandrel moves along with the moving object during the application of the sleeve. Additionally, the system may further comprise a second engagement drive unit for pushing the second mandrel in a direction opposite to the first direction after applying the sleeve to bring the second mandrel into a position for receiving a next sleeve. Furthermore, the system may comprise a second application drive unit for moving the heat-shrinkable sleeve over the second mandrel towards the object, wherein the second engagement drive unit is configured to keep the second application drive unit in engagement with the sleeve during the application of the sleeve, and wherein the second engagement drive unit is configured to push the second application drive unit against the second mandrel after applying the sleeve thereby pushing the second mandrel in said opposite direction.

The system may comprise a control unit for at least controlling the first engagement drive unit and a sensor for detecting the moving object, wherein the control unit can be configured to control the first engagement unit in dependence of detecting the moving object. More in particular, the control unit may be further configured for controlling the second engagement drive unit such that the first and second engagement drive units operate in a synchronous manner. Here, synchronous operation indicates that the timing of the first and second first engagement units is correlated. It does not necessarily mean that the first and second engagement units perform identical movements.

The first and/or second application drive unit may comprise a drivable roller and a first actuator for rotating the drivable roller, wherein the second mandrel preferably comprises a roller arranged opposite to said drivable roller. The drivable roller and the corresponding roller in the second mandrel form a pair of rollers in between which the sleeves can be guided.

The drivable roller may be mounted on a shaft, said first and/or second application drive unit comprising a first arm that is rotatably mounted to a frame at an end thereof, said first arm having the shaft arranged at another end thereof, wherein the first and/or second engagement drive unit is configured to rotate the first arm. Furthermore, the first actuator of the first and/or second application drive unit may be fixedly mounted to the frame, said first and/or second application drive unit preferably further comprising a transmission between the fixedly mounted first actuator and the rotatably mounted drivable roller.

The first and/or second engagement drive unit may comprise a second arm that is coupled to the first arm of the first and/or second application drive unit, respectively, and a second actuator for moving the second arm. The second actuator can be fixedly mounted to the frame, said second actuator preferably having a rotatable output shaft, and wherein the second arm can be coupled to the output shaft in an eccentric manner.

Due to the eccentricity, the second arm will produce a back and forth moving action when the output shaft of the second actuator rotates. This motion is used to bring the drivable rollers of the first and/or second application drive units into engagement with the sleeve. As an example, the output shaft can be coupled to a coupling element at a center thereof, and wherein the second arm is coupled to the coupling element at a position away from said center. Furthermore, the second arm may be hingedly coupled to the first shaft.

The second mandrel can be configured to move between a first position at which position the application of the sleeve starts and a second position at which the movement of the second mandrel in the first direction ends, said positions corresponding to extreme positions of the second arm relative to the coupling element.

The second mandrel system may comprise at least one strengthened leaf spring for allowing the relative movement between the first and second mandrel in the first direction. This leaf spring can be pre-biased to position the second mandrel upstream relative to the first mandrel when the application of the sleeve starts. Furthermore, a positional shift of the second mandrel relative to the first mandrel in the first direction may correspond to half of a stroke made by the second mandrel during the application of the sleeve.

According to a further aspect, the present invention provides a method for applying a heat-shrinkable sleeve to an object that moves in a first direction, comprising 1) receiving a heat-shrinkable sleeve, 2) moving the heat-shrinkable sleeve over a first mandrel to a downstream end of the first mandrel, 3) receiving the heat-shrinkable sleeve from the first mandrel and moving the heat-shrinkable sleeve on a second mandrel towards the object, wherein the second mandrel is moveably connected to the first mandrel at the downstream end thereof, and wherein the second mandrel is able to move back and forth relative to the first mandrel in at least the first direction, and 4) moving the heat-shrinkable sleeve on the second mandrel towards the object.

The method according to the invention is characterized by pushing the second mandrel such that the second mandrel moves along with the moving object during the application of the sleeve.

The method may further comprise pushing the second mandrel in a direction opposite to the first direction after applying the sleeve to bring the second mandrel into a position for receiving a next sleeve. In addition, the method may further comprise detecting the moving object and starting said pushing the second mandrel to move along with the moving object in dependence of said detecting.

The steps of said pushing the second mandrel to move along with the moving object and said pushing the second mandrel in a direction opposite to the first direction may be synchronized.

Next, the present invention will be described using the appended figures, wherein.

Figure 1:
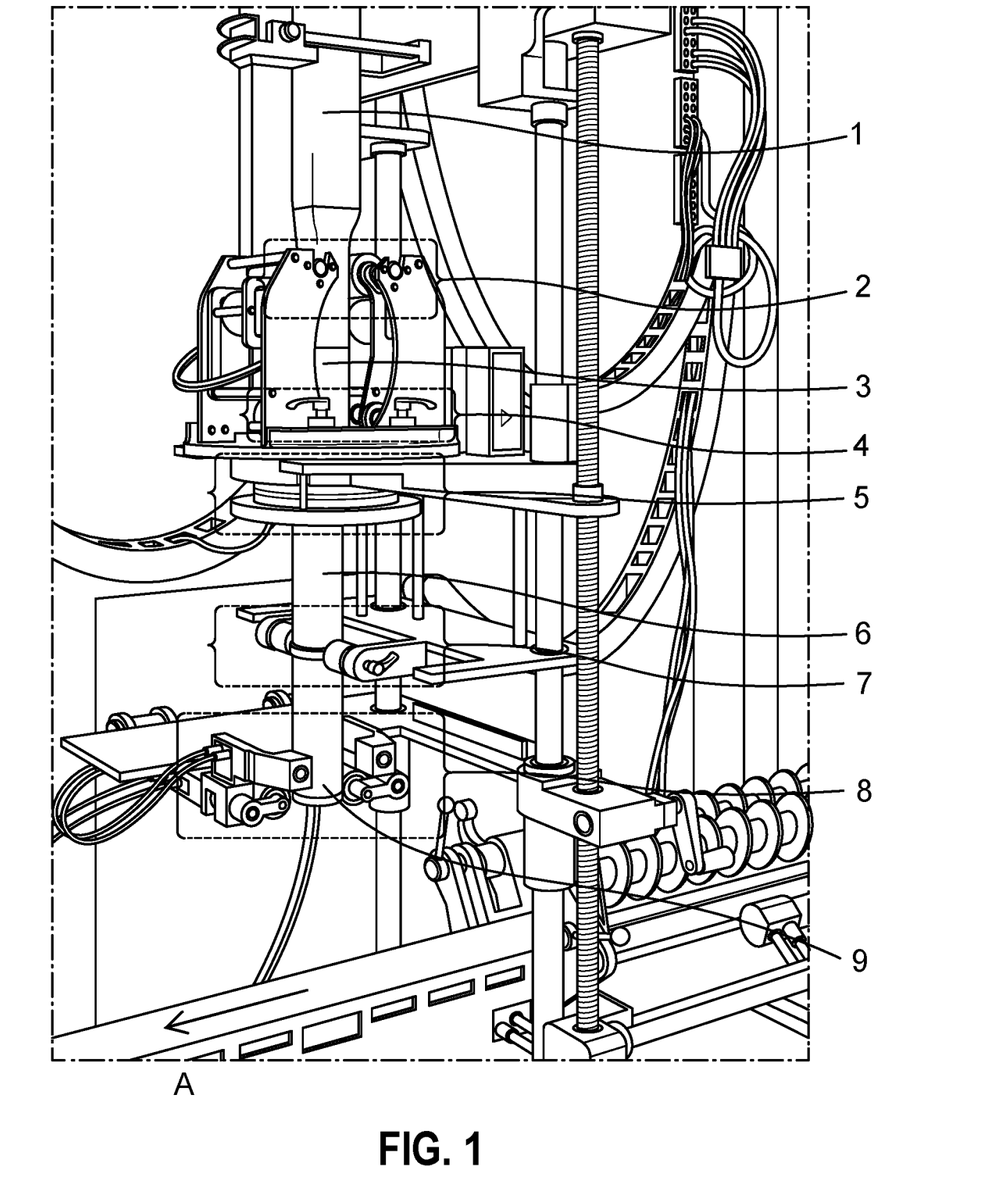
FIG. 1 illustrates an embodiment of the sleeve applicator system in accordance with the present invention.

FIG. 1 illustrates an embodiment of the sleeve applicator system in accordance with the present invention. This system is configured for the application of sleeves on objects that move in a direction indicated by arrow A. It comprises a supply for supplying a sleeve film 1 in a flat shape. The flat sleeve film 1 is supplied to a first mandrel system that comprises a first mandrel 3 that is mounted using a mounting unit 2. In FIG. 1, it can be seen that sleeve film 1 is opened by mandrel 3 such that sleeve film 1 assumes a tubular shape.

A first drive system 4 is shown that comprises one or more rollers for moving sleeve film 1 from first mandrel 3 downwards towards a ring cutter 5 that is configured to cut sleeve film 1 into separate sleeves 6. First drive system 4 comprises further rollers 7 for pushing a separated sleeve 6 away from first mandrel 3. These latter rollers 7 are used in known systems for applying a separated sleeve 6 directly onto the moving object.

FIG. 1 illustrates a second mandrel system 8 comprising a second mandrel 9 that is moveably connected to first mandrel 3. Second mandrel 9 is able to move back and forth relative to first mandrel 3 in the direction indicated by arrow A.

Second mandrel system 8 comprises a second drive system 10 for receiving sleeves 6 from first mandrel 3 and for moving sleeves 6 over second mandrel 9 towards the object. This latter system is shown in more detail in FIG. 2.

Figure 2:
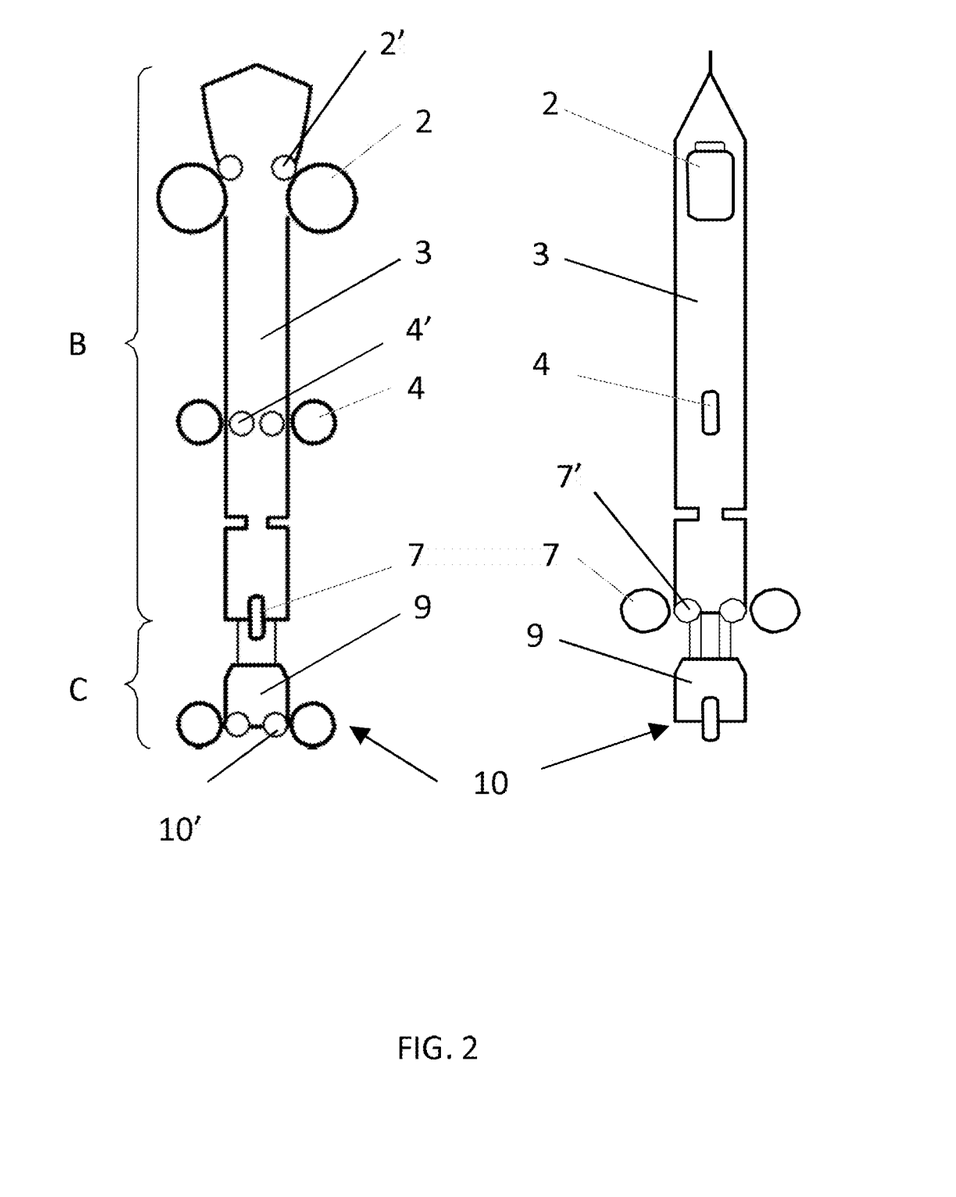
FIG. 2 illustrates two schematic side views corresponding to the system of FIG. 1.

FIG. 2 illustrates two schematic side views correspond to the system of FIG. 1. As shown, mounting unit 2 comprises a pair of rollers 2, 2' for guiding sleeve film 1 onto first mandrel 3. In addition, first drive system 4 also comprises a pair of rollers 4, 4' for driving sleeve film 1 towards ring cutter 5 and a pair of rollers 7, 7' for moving separated sleeves 6 downwards. Generally, rollers 4, rollers 7 and/or rollers 2 are drivable by means of suitable actuators.

In FIG. 2, the components denoted by B are known from the prior art. The components indicated by C represent the components that can be added to the known systems to modify these systems in accordance with the present invention. Components C include second mandrel 9 and a second drive system that comprises rollers 10 and 10', the latter rollers 10' being arranged in second mandrel 9. As stated above, second mandrel 9 can move relative to first mandrel 3 to at least partially follow the movement of the object.

Sleeve applicators are available for two categories, i.e. so called linear applicators in which the objects move in a straight direction, and carrousel applicators in which the objects move in a circular direction. In linear applicators, the sleeve applicator is at rest and the sleeve is shot onto an object that moves underneath the applicator. The product only remains underneath the applicator for a limited amount of time. Hence, the sleeve has to be applied very quickly. In a carrousel type of applicator, the applicator moves along with the product, resulting in more time for sleeve application. These latter systems are well suited for high throughput applications.

The system according to the invention enables the sleeve applicator to follow the horizontal movement of the object over a small distance to increase the time that is available for applying the sleeve. Consequently, the speed with which the sleeves are transported and applied can be lowered. This makes the sleeves less susceptible to deformation or collapsing by air flow or by friction or contact with the object, for example caused by a protruding part of the object. For longer sleeves, it becomes possible to keep the distance between object and the second mandrel small, which improves the rigidity of the sleeve. It also becomes possible to work with sleeves with less oversize at high throughputs in combination with objects for which it is normally difficult to apply sleeves. Examples of such objects are objects having at an upper side thereof a circumference that is substantially equal to the maximum circumference of the object.

This system is particularly well suited for linear applicators although application of the present invention in carrousel type applicators is not excluded.

Figure 3:
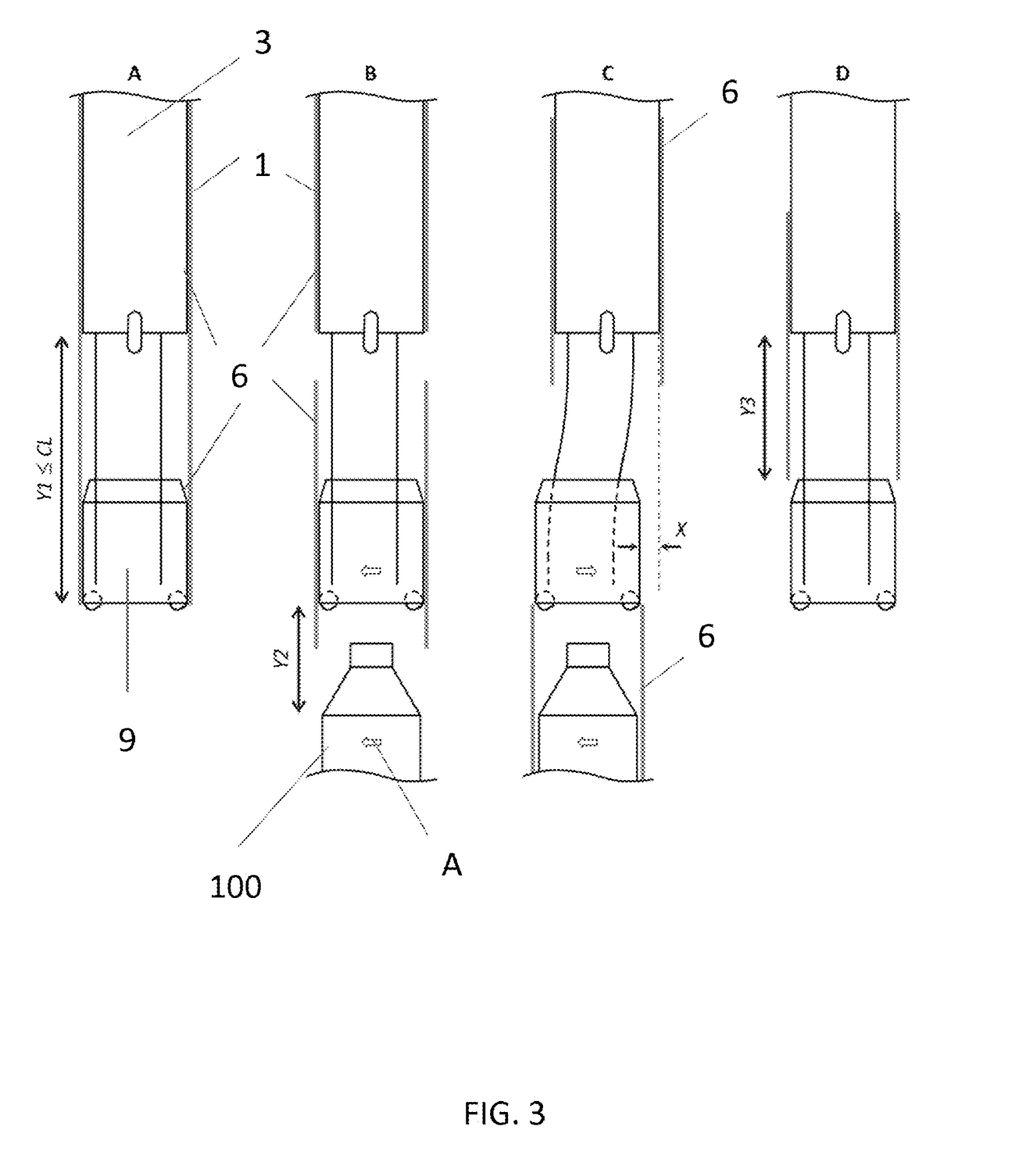
FIG. 3 illustrates the application of a sleeve onto an object in accordance with the present invention.
Figure 4:
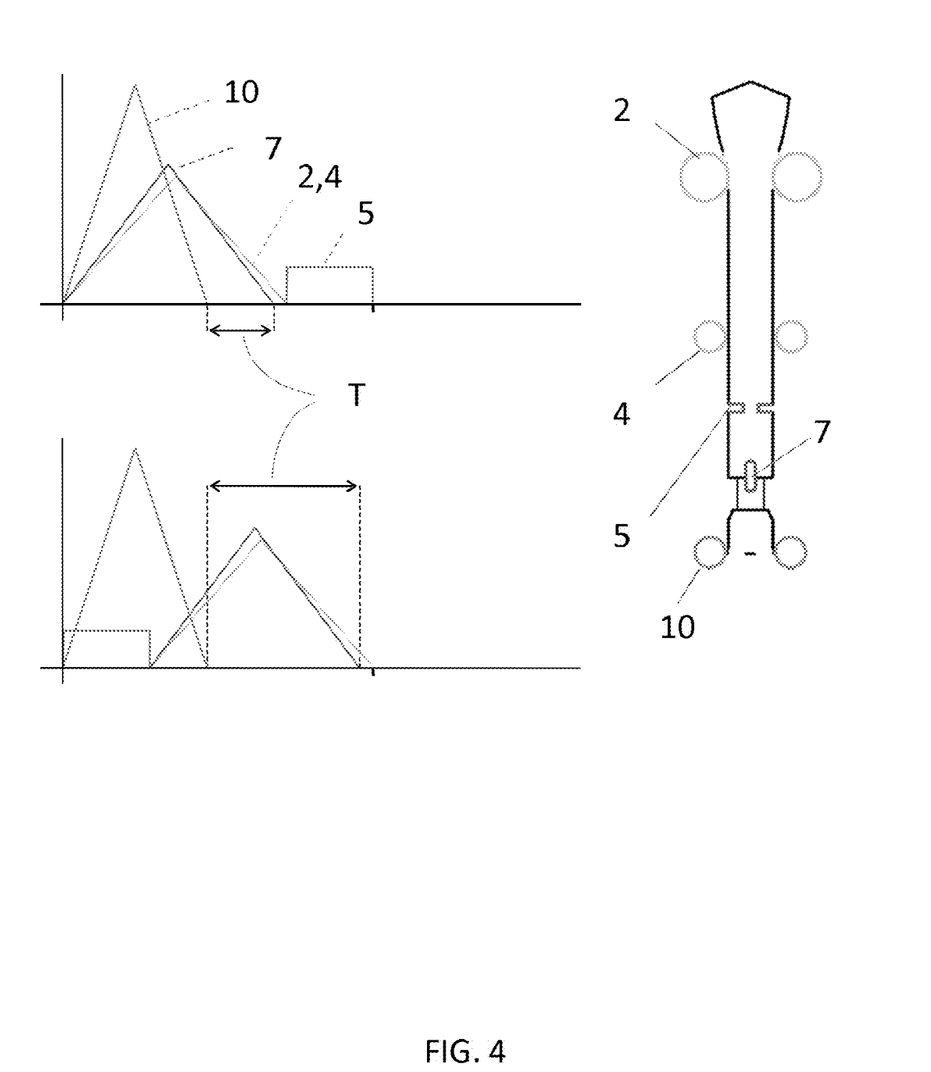
FIG. 4 shows two possible timing scenarios for applying a sleeve onto an object in accordance with the present invention.

FIG. 3 illustrates the application of a sleeve onto an object 100 moving in a direction indicated by arrow A. FIG. 4 shows two possible timing scenarios for applying a sleeve onto an object. More in particular, the graphs on the left indicate at what time the various rollers and ring cutter 5 are operated.

FIG. 3, situation A, corresponds to the starting condition. In this condition a sleeve 6 is arranged on first mandrel 3 and another sleeve 6 is arranged on second mandrel 9. As a first step, rollers 10 are actuated allowing the lowest sleeve to be shot onto object 100. During this step, second mandrel 9 will move along with object 100, see situations B and C. More in particular, during a short period in time, the speed of object 100 will match that of second mandrel 9.

When sleeve 6 has left second mandrel 9, second mandrel 9 will be brought back to its starting position, see situations C and D. It must reach this position to enable the other separated sleeve 6 to be brought onto second mandrel 9, see situation D. More in particular, second mandrel 9 must be in its starting position before the other separated sleeve has covered distance Y3.

Rollers 7 are actuated for moving the other separated sleeve downwards to second mandrel 9. This process starts substantially at the same time (FIG. 4 top graph) or after (FIG. 4 bottom graph) the start of the actuation of rollers 10.

The process of applying sleeves can be divided in cycles, with each cycle corresponding to the time required for applying a single sleeve. Such cycle comprises the time required to transport the sleeve and the time required to cut the sleeve. As soon as a sleeve has been cut, it can be applied to a product.

According to the top graph in FIG. 4, the sleeve on the second mandrel is moved at the start of each cycle. At the same time, the sleeve that is upstream of that sleeve is transported downward by means or actuating rollers 7. Furthermore, the sleeve film is transported downwards by rollers 2 and 4 to position the film such that it can be cut at a later stage using the ring cutter.

According to the bottom graph in FIG. 4, the sleeve on the second mandrel is moved at the start of each cycle. At the start of each cycle, no sleeve other than the sleeve on the second mandrel has been separated by ring cutter 5. More in particular, ring cutter 5 is actuated at the same time as actuating rollers 10. After cutting, the separated sleeve is transported downwards by rollers 7 and at the same time, rollers 2, 4 are actuated for transporting the sleeve film to bring the film into position for ring cutter 5.

The time T to move second mandrel 9 back to its original position corresponds to the time in between the end of actuating rollers 10 and the end of actuating rollers 7. As can be seen in FIG. 4, the timing indicated in the bottom graph displays a larger time for returning the second mandrel to its original position. Alternatively, the time during which the second mandrel moves along with the object in a synchronous manner can be increased, because sufficient time is available for returning the second mandrel to its original position.

Figure 5:
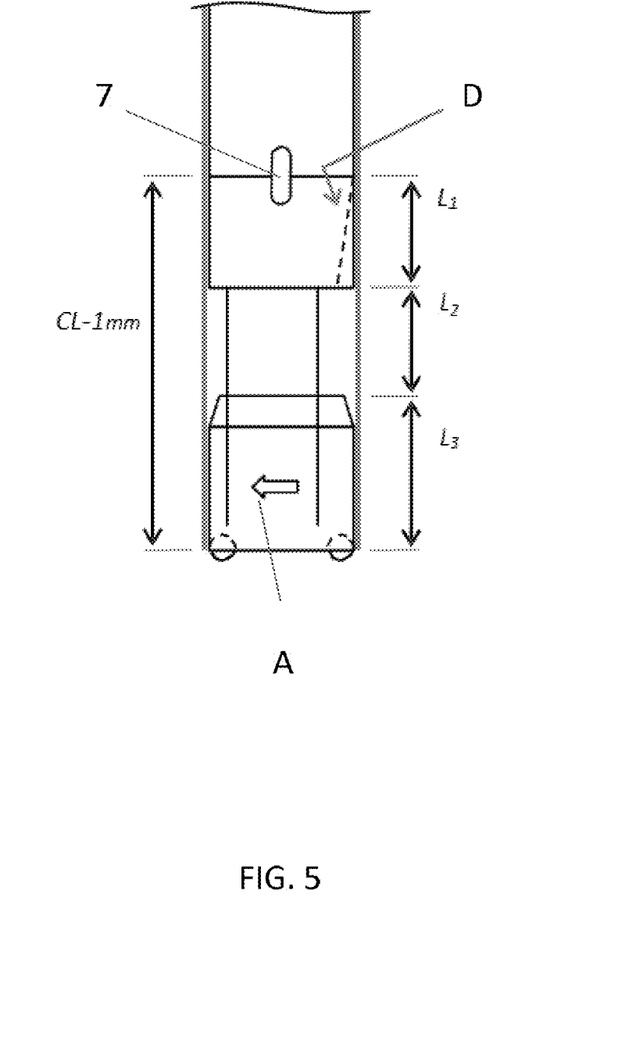
FIG. 5 illustrates the shape and dimensioning of the second mandrel of FIG. 1 in accordance with the present invention.

FIG. 5 illustrates the shape and dimensioning of the second mandrel in accordance with the present invention. The height of the second mandrel is defined as L3 in FIG. 5. Also indicated is a length L1 along which the first mandrel is extended and a length L2 in between the end of this elongation and the second mandrel. The length of a separated sleeve is denoted as the cut length CL. According to FIG. 5, L1+L2+L3 equals CL minus 1 mm. Here, 1 mm is taken as an example. This length ensures that a separated sleeve can be engaged by rollers 10. In other embodiments, CL is smaller than L1+L2+L3. In such embodiments, the inertia of the sleeve is used to ensure that a sleeve can be engaged by rollers 10 when being transported by rollers 7.

If CL is relatively large, it becomes impossible to transport the sleeve off the second mandrel only during the sideward motion of the second mandrel. Instead, the sleeve needs to be transported over distance L1 to free itself from the elongation of the first mandrel. Thereafter, the sideward motion of the second mandrel can be started.

The elongation can be provided with an inclined portion to be able to start the sideward motion of the second mandrel before the sleeve has fully cleared itself from the first mandrel without risking the tearing or wrinkling of the sleeves. In addition, in most cases, the sleeve will be slightly larger than the first mandrel or the second mandrel. Consequently, the second mandrel can already move slightly before the sleeve has cleared itself from the elongation.

Figure 6:
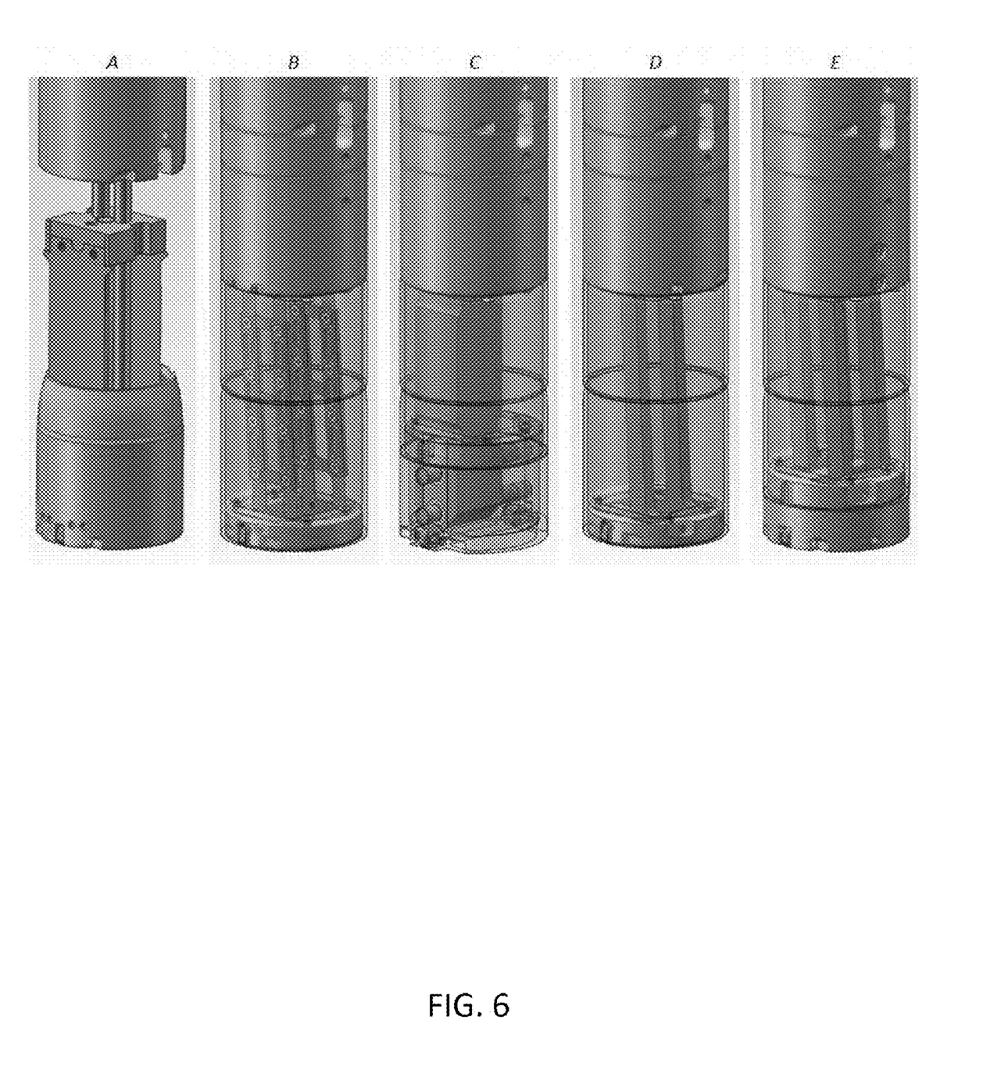
FIG. 6 illustrates various alternatives for allowing the second mandrel to move relative to the first mandrel in the system of FIG. 1.

FIG. 6 illustrates various alternatives for allowing second mandrel to move relative to the first mandrel. FIG. 6, embodiment A, illustrates leaf springs arranged in a parallel manner. Embodiment B comprises the leaf springs of embodiment A albeit with a reinforcement to increase the stiffness of the leaf springs. Embodiment C comprises parallel shafts combined with sliding bearings whereas embodiment D comprises fixed hinges with sliding bearings. Embodiment E comprises the fixed hinges with sliding bearings of embodiment D in a duplicated form.

Typically, the second mandrel moves between a first and second position, the first position corresponding to the position directly underneath the first mandrel and the second position corresponding to the position at the end of the sideward motion of the second mandrel. To move the second mandrel to the second position, a given force F is needed. By applying a pre-biasing force equal to F/2 to the spring leafs, it becomes possible to reduce the forces required by the second drive system to move the second mandrel between the first and second positions.

Figure 7A:
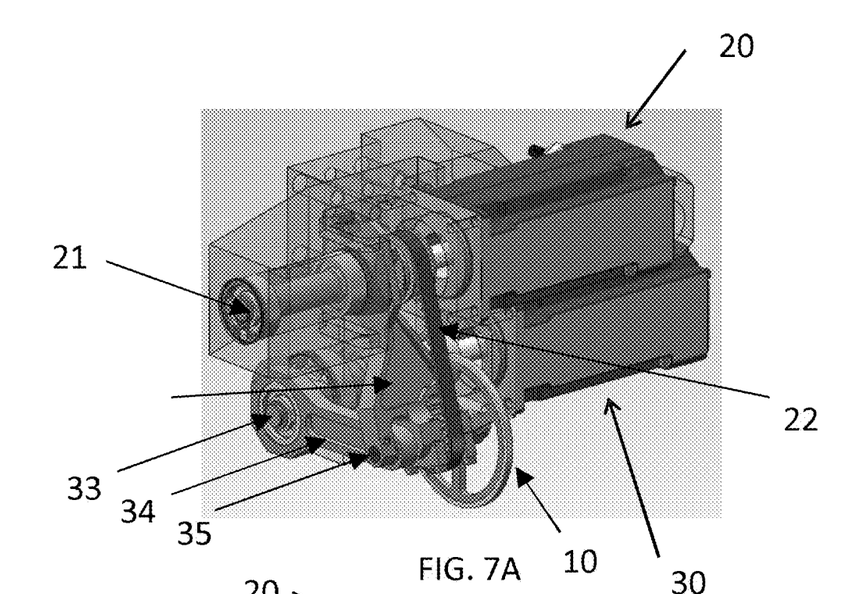
FIGS. 7A and 7B illustrate an embodiment of the second drive system of the system in FIG. 1.
Figure 7B:
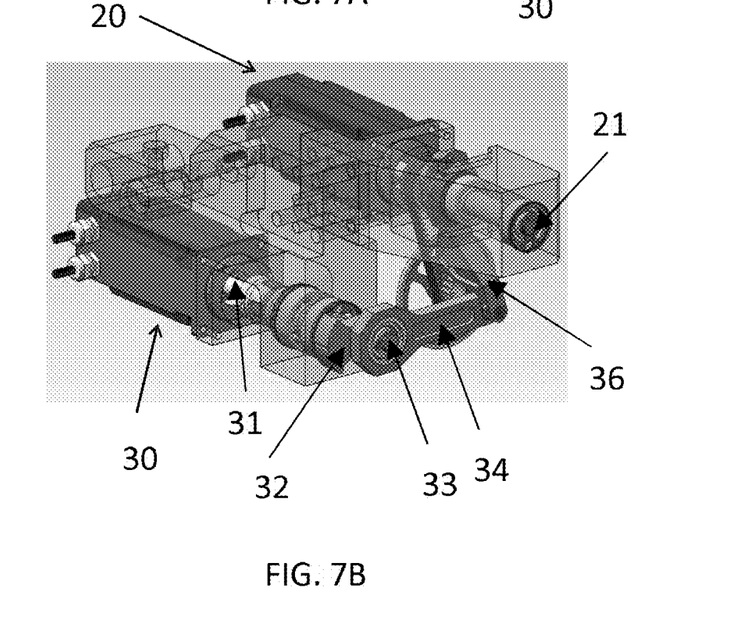

FIGS. 7A and 7B illustrate an embodiment of the second drive system. It comprises a first actuator 20 that comprises a servo motor having a drive shaft 21. The system further comprises a second actuator 30 that comprises a servo motor having a drive shaft 31. As shown in FIG. 7B, drive shaft 31 is connected to an eccentric element 32. This latter element is rotatably connected via shaft 33 to arm 34. In turn, arm 34 is rotatably connected to an arm 36 via shaft 35. Roller 10 is mounted to arm 36. A transmission belt 22 is used to actuate roller 10 via actuator 20.

During operation, actuation by actuator 30 will cause roller 10 to perform a back and forth motion while at the same time actuation by actuator 20 will cause roller 10 to rotate. In this manner, the second drive system is able to transfer a sleeve while at the same time pushing against the second mandrel.

The second drive system comprises a pair of the units depicted in FIG. 7A, arranged on opposite sides of the mandrel in the direction of transport of the object. These units can be controlled such that the rollers associated with them perform an identical motion.

Rollers 10 move between two extreme positions in the direction of transport of the object. These rollers should be sufficiently large to prevent the sleeve from hitting other parts of the second drive system such as the actuators during operation.

By configuring the units such that when roller 10 of one unit is in one extreme position, roller 10 of the other unit is in the other extreme position, it becomes possible to reduce the size of rollers 10 without risking that the sleeve will hit other parts of the second drive system. However, this requires a more complicated controlling scheme for controlling the actuators of the second drive system. Such scheme is illustrated in FIGS. 8A and 8B.

Figure 8A:
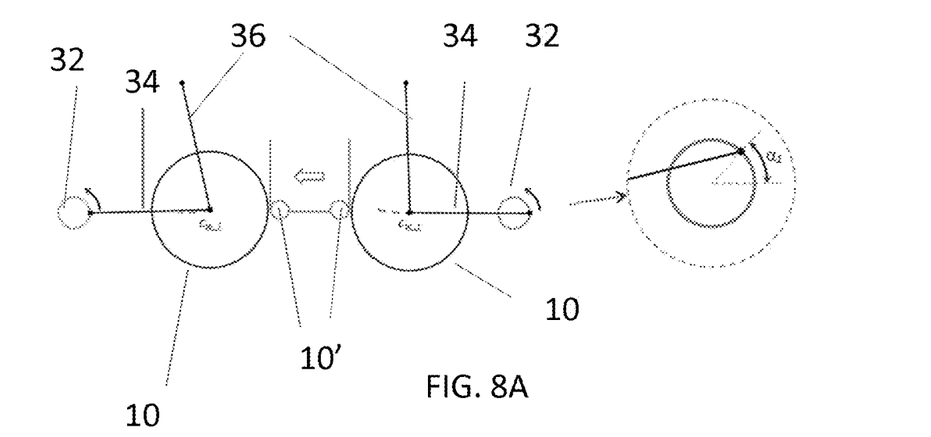
FIGS. 8A and 8B illustrate the motion of the eccentric elements of the second drive system of FIG. 7A.

FIG. 8A illustrates the motion of the eccentric elements 32 with a maximum displacement of arm of 20 mm with the radius of the eccentric element being $r_e$=10 mm. As shown, two eccentric elements 32 are used that correspond to different units arranged on opposite sides of the object. The object is moving at a constant speed of 40 m/min.

Figure 8B:
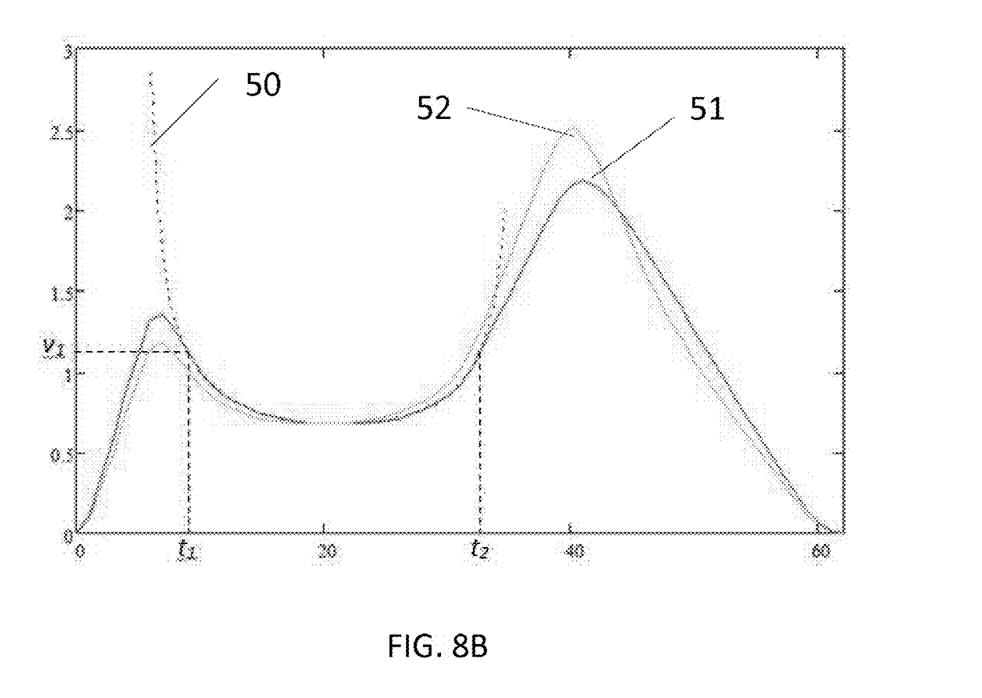

FIG. 8B illustrates the rotational speed of the eccentric elements, i.e. $d/dt(\alpha_1 \times r_e)$ with $d/dt$ being the time derivative and $\alpha_1$ the angular position of eccentric element 32 in radials as illustrated in FIG. 8A.

Curve 50 illustrates the ideal rotational speed eccentric element 32 on the right should attain to provide the second mandrel with a constant speed to the left that equals the speed of the object. Curve 50 depends on the angular position of eccentric element 32. Accordingly, in FIG. 8B, each point on curve 50 is associated with a given angular position.

On the other hand, curves 51 and 52 illustrate the true rotational speed of eccentric element 32 of the unit on the right and left, respectively, as a function of time. The angular position of eccentric element 32 corresponds to the integral of curve 51 or curve 52.

To ensure that the second mandrel moves along with the object at the same speed, a given rotational speed of eccentric element 32 on the right should be reached at a given angular position. In FIG. 8B, this situation is reached at t=t1. More in particular, at t=t1, the rotational speed that eccentric element 32 on the right has while being at a given angular position corresponds to the ideal situation indicated by curve 50. The transitional period between t=0 and t=t1 is used to reached this condition. For a single cycle, the integral of curves 51 and 52 should be equal to $2\pi$, corresponding to a full rotation of eccentric element 32. Here, it is noted that the behavior of eccentric element 32 on the left, during the time that the second mandrel is being pushed by roller 10 of the unit on the right, can be derived from the behavior of eccentric element 32 on the right.

When returning the second mandrel to its original position at time t=t2, the roller of the left unit should push the second mandrel back. To this end, the speed of the eccentric element on the left should follow curve 52.

The horizontal displacement of the center of the roller on the right should be equal to the horizontal displacement of the center of the roller on the left during each stroke. However, because the paths of arms 34, 36 is different, curves 51 and 52 are not identical.

To ensure that the second mandrel moves at the same speed as the object while being in a position directly above the object, a sensor can be used to sense the position of the object. Once a predefined position of the object upstream of the sleeve applicator system is detected, the abovementioned timing can be followed. By changing the triggering of the applicator system, i.e. by changing the moment in time when the actuators of the second drive system start operating in accordance with FIG. 8B, a positional shift in the horizontal direction between the object and the second mandrel can be created during the time the object and the second mandrel move at the same speed.

Because the second mandrel moves along with the object, more time is created for the sleeve application. Consequently, sleeves can be applied at slower speeds with more control.

Moreover, the distance between the lower end of the second mandrel and the upper side of the product can be reduced. The application of the sleeve can therefore be performed while better maintaining the shape of the sleeve, whereas it is easier to apply the sleeve over the shoulders of the object.

The present invention reduces the risk of sleeves tilting and bouncing back during sleeve application. Such bouncing could cause jamming Therefore, the present invention allows the pitch between adjacent objects on the conveyor belt to be reduced while reducing the belt speed. As such, the sleeve application can be performed more easily.

Compared to known approaches, the sleeve does not need to tilt on the mandrel during sleeve application. As such, the dimensions of the sleeve can more closely follow the dimensions of the mandrel. This will increase the stiffness of the sleeve at the bottom end allowing the sleeve to be more easily pushed over the shoulders of an object.

Although the present invention has been described using detailed embodiments, the skilled person will understand that the present invention is not limited to these embodiments but that various modifications are possible without deviating from the scope of the invention which is defined by the appended claims.

The invention claimed is:

1. A sleeve applicator system for applying a heat-shrinkable sleeve to an object that moves in a first direction, comprising:
    a first mandrel system comprising:
        a first mandrel for receiving the heat-shrinkable sleeve;

a first drive system comprising one or more rollers for moving the heat-shrinkable sleeve over the first mandrel to a downstream end of the first mandrel;

a second mandrel system comprising:
 a second mandrel that is moveably connected to the first mandrel at the downstream end thereof, wherein the second mandrel is configured to move back and forth relative to the first mandrel in at least the first direction; and
 a second drive system comprising one or more rollers for receiving the heat-shrinkable sleeve from the first mandrel and for moving the heat-shrinkable sleeve over the second mandrel towards the object;
 wherein the second drive system is further configured to push the second mandrel such that the second mandrel moves along with the moving object during the application of the heat-shrinkable sleeve.

2. The sleeve applicator system according to claim 1, wherein the second drive system comprises:
 a first application drive unit comprising a first actuator coupled with the one or more rollers of the second drive system, wherein the first application drive unit is configured to move the heat-shrinkable sleeve over the second mandrel towards the object; and
 a first engagement drive unit comprising a second actuator coupled with the one or more rollers of the second drive system, wherein the first engagement drive unit is configured to push the first application drive unit into engagement with the heat-shrinkable sleeve thereby simultaneously pushing the second mandrel such that the second mandrel moves along with the moving object during the application of the heat-shrinkable sleeve.

3. The sleeve applicator system according to claim 2, further comprising a second engagement drive unit comprising a third actuator coupled with the one or more rollers of the second drive system, wherein the second engagement drive unit is configured to push the second mandrel in a direction opposite to the first direction after applying the heat-shrinkable sleeve to bring the second mandrel into a position for receiving a next heat-shrinkable sleeve.

4. The sleeve applicator system according to claim 3, further comprising a second application drive unit comprising a fourth actuator coupled with the one or more rollers of the second drive system, wherein the second application drive unit is configured to move the heat-shrinkable sleeve over the second mandrel towards the object, wherein the second engagement drive unit is configured to keep the second application drive unit in engagement with the heat-shrinkable sleeve during the application of the heat-shrinkable sleeve, and wherein the second engagement drive unit is configured to push the second application drive unit against the second mandrel after applying the heat-shrinkable sleeve thereby pushing the second mandrel in said opposite direction.

5. The sleeve applicator system according to claim 2, further comprising a control unit in communication with the first engagement drive unit and a sensor for detecting the moving object, wherein the control unit is configured to control the first engagement drive unit in dependence of detecting the moving object by the sensor.

6. The sleeve applicator system according to claim 5, further comprising a second engagement drive unit comprising a third actuator coupled with the one or more rollers of the second drive system, wherein the second engagement drive unit is configured to push the second mandrel in a direction opposite to the first direction after applying the heat-shrinkable sleeve to bring the second mandrel into a position for receiving a next sleeve, wherein the control unit is further configured for controlling the second engagement drive unit such that the first and second engagement drive units operate in a synchronous manner.

7. The sleeve applicator system according to claim 2, wherein the first application drive unit comprises a drivable roller rotatable by the first actuator, wherein the second mandrel comprises a roller arranged opposite to said drivable roller.

8. The sleeve applicator system according to claim 7, wherein the drivable roller is mounted on a first shaft, said first application drive unit comprising a first arm that is rotatably mounted to a frame at an end thereof, said first arm having the first shaft arranged at another end thereof, wherein the first engagement drive unit is configured to rotate the first arm.

9. The sleeve applicator system according to claim 8, wherein the first actuator of the first application drive unit is fixedly mounted to the frame, said first application drive unit further comprising a transmission between the fixedly mounted first actuator and the rotatably mounted drivable roller.

10. The sleeve applicator system according to claim 8, wherein the first engagement drive unit comprises a second arm that is coupled to the first arm of the first application drive unit, wherein the second actuator is configured to move the second arm.

11. The sleeve applicator system according to claim 10, wherein the second actuator is fixedly mounted to the frame, said second actuator having a rotatable output shaft, and wherein the second arm is coupled to the rotatable output shaft in an eccentric manner.

12. The sleeve applicator system according to claim 11, wherein the rotatable output shaft is coupled to a coupling element at a center thereof, and wherein the second arm is coupled to the coupling element at a position away from said center.

13. The sleeve applicator system according to claim 12, wherein the second mandrel is configured to move between a first position at which position the application of the heat-shrinkable sleeve starts and a second position at which the movement of the second mandrel in the first direction ends, said positions corresponding to extreme positions of the second arm relative to the coupling element.

14. The sleeve applicator system according to claim 10, wherein the second arm is hingedly coupled to the first shaft.

15. The sleeve applicator system according to claim 1, wherein the second mandrel comprises at least one strengthened leaf spring for allowing the relative movement between the first and second mandrel in the first direction.

16. The sleeve applicator system according to claim 15, wherein the leaf spring is pre-biased to position the second mandrel upstream relative to the first mandrel when the application of the heat-shrinkable sleeve starts.

17. The sleeve applicator system according to claim 16, wherein a positional shift of the second mandrel relative to the first mandrel in the first direction corresponds to half of a stroke made by the second mandrel during the application of the heat-shrinkable sleeve.

18. A method for applying a heat-shrinkable sleeve to an object that moves in a first direction, comprising:
 receiving the heat-shrinkable sleeve;
 moving the heat-shrinkable sleeve over a first mandrel to a downstream end of the first mandrel;
 receiving the heat-shrinkable sleeve from the first mandrel and moving the heat-shrinkable sleeve on a second mandrel towards the object, wherein the second mandrel is moveably connected to the first mandrel at the downstream end thereof, and wherein the second mandrel is able to move back and forth relative to the first mandrel in at least the first direction; and moving the heat-shrinkable sleeve on the second mandrel towards the object; and pushing the second mandrel such that the second mandrel moves along with the moving object during the application of the heat-shrinkable sleeve.

19. The method according to claim 18, further comprising pushing the second mandrel in a direction opposite to the first direction after applying the heat-shrinkable sleeve to bring the second mandrel into a position for receiving a next sleeve.

20. The method according to claim 19, further comprising detecting the moving object and starting said pushing the second mandrel to move along with the moving object in dependence of said detecting.

\* \* \* \* \*